United States Patent [19]
Odell

[11] Patent Number: 5,354,840
[45] Date of Patent: Oct. 11, 1994

[54] FUNCTIONAL-AMINE POLYESTERS

[75] Inventor: Peter G. Odell, Mississauga, Canada

[73] Assignee: Xerox Corporation, Stamford, Conn.

[21] Appl. No.: 118,845

[22] Filed: Sep. 10, 1993

[51] Int. Cl.$^5$ .......................................... C08G 69/44
[52] U.S. Cl. ...................... 528/288; 528/87;
528/106; 528/110; 528/112; 528/176; 528/185;
528/272; 528/274; 528/289; 528/291; 528/296;
528/297; 528/299; 528/300; 528/302; 528/303;
528/305; 528/306; 528/308; 528/308.6;
528/351; 528/370; 528/392; 528/393
[58] Field of Search ............... 528/272, 274, 288, 289,
528/291, 296, 297, 299, 300, 302, 303, 305, 306,
308, 308.6, 351, 370, 392, 393, 87, 106, 110, 112,
176, 185; 525/437, 443; 524/700

[56] References Cited

U.S. PATENT DOCUMENTS

| | | | |
|---|---|---|---|
| 3,590,000 | 6/1971 | Palermiti et al. | 430/110 |
| 3,681,106 | 8/1972 | Burns et al. | 430/120 |
| 4,649,175 | 3/1987 | Inoue et al. | 525/38 |
| 4,977,294 | 12/1990 | Uphues et al. | 558/208 |
| 5,053,463 | 10/1991 | Inoue | 525/427 |
| 5,124,433 | 6/1992 | Inoue | 528/272 |

OTHER PUBLICATIONS

Brauer et al., "Initiator–Accelerator Systems for Dental Resins," F. E. Jr. Ed., American Chemical Society, pp. 359–371 (1983).

Xin-De Feng, "The Role of Amine in Vinyl Radical Polymerization," *International Symposium on Olefin and Vinyl Polymerzation & Functionalization Reaction, Mechanism and Industrial Application, Die Makro Molekulare Chemie, Macromolecular Symposia*, 63, pp. 1–17 (Oct. 1992).

Primary Examiner—Samuel A. Acquah
Attorney, Agent, or Firm—Oliff & Berridge

[57] ABSTRACT

Functional-amine polyesters have at least a first residue of a first monomer, a second residue of a second monomer and from about 0.1 to about 3.0 mole percent of a functional-amine residue of a functional amine prepared by reacting the first and second monomers and the functional amine in an inert atmosphere. The functional amine has a functional group which facilitates polymerizing the amine and the first and second monomers. The amine residue facilitates reaction of the functional-amine polyester in an organic peroxide cross-linking reaction system.

12 Claims, 3 Drawing Sheets

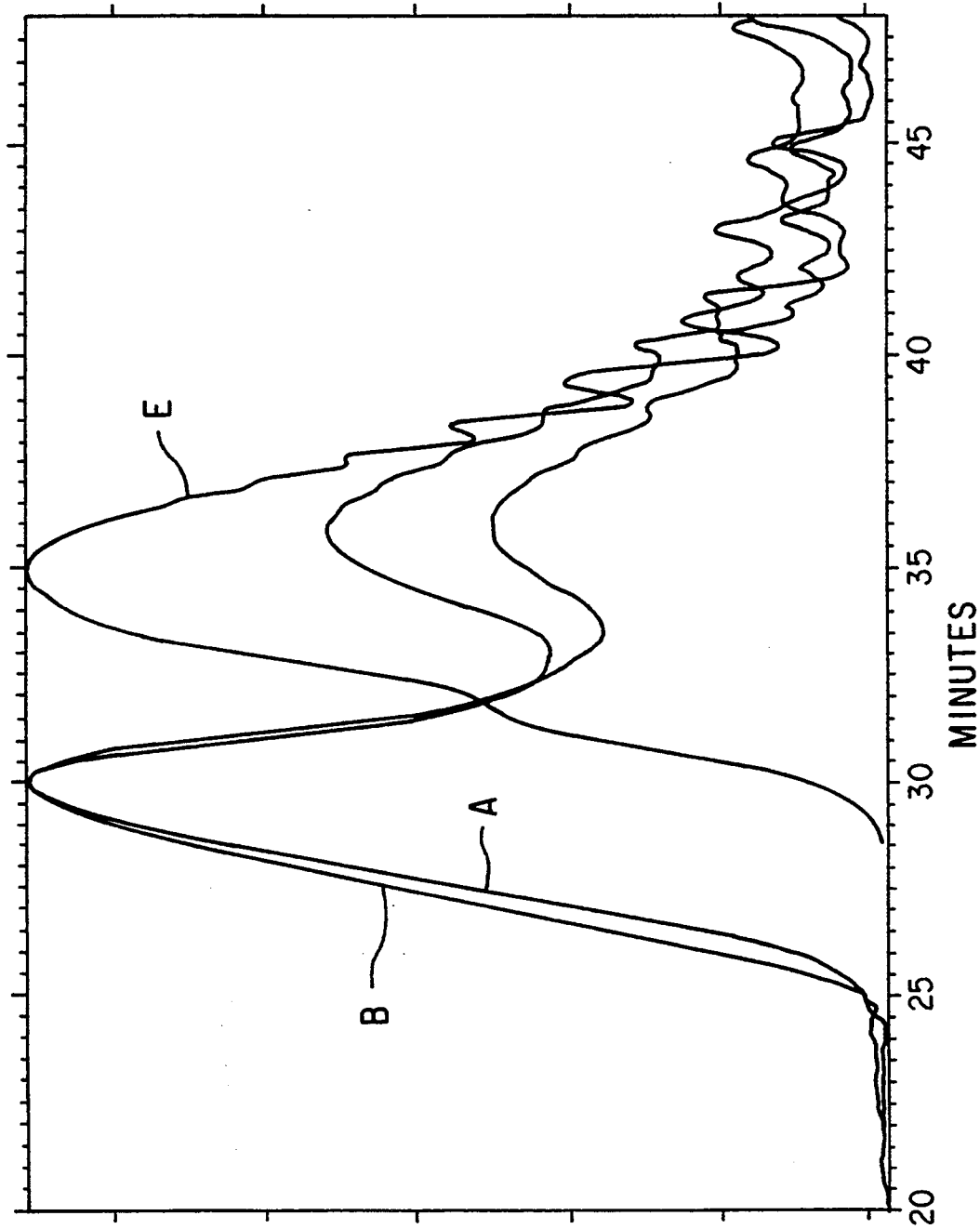

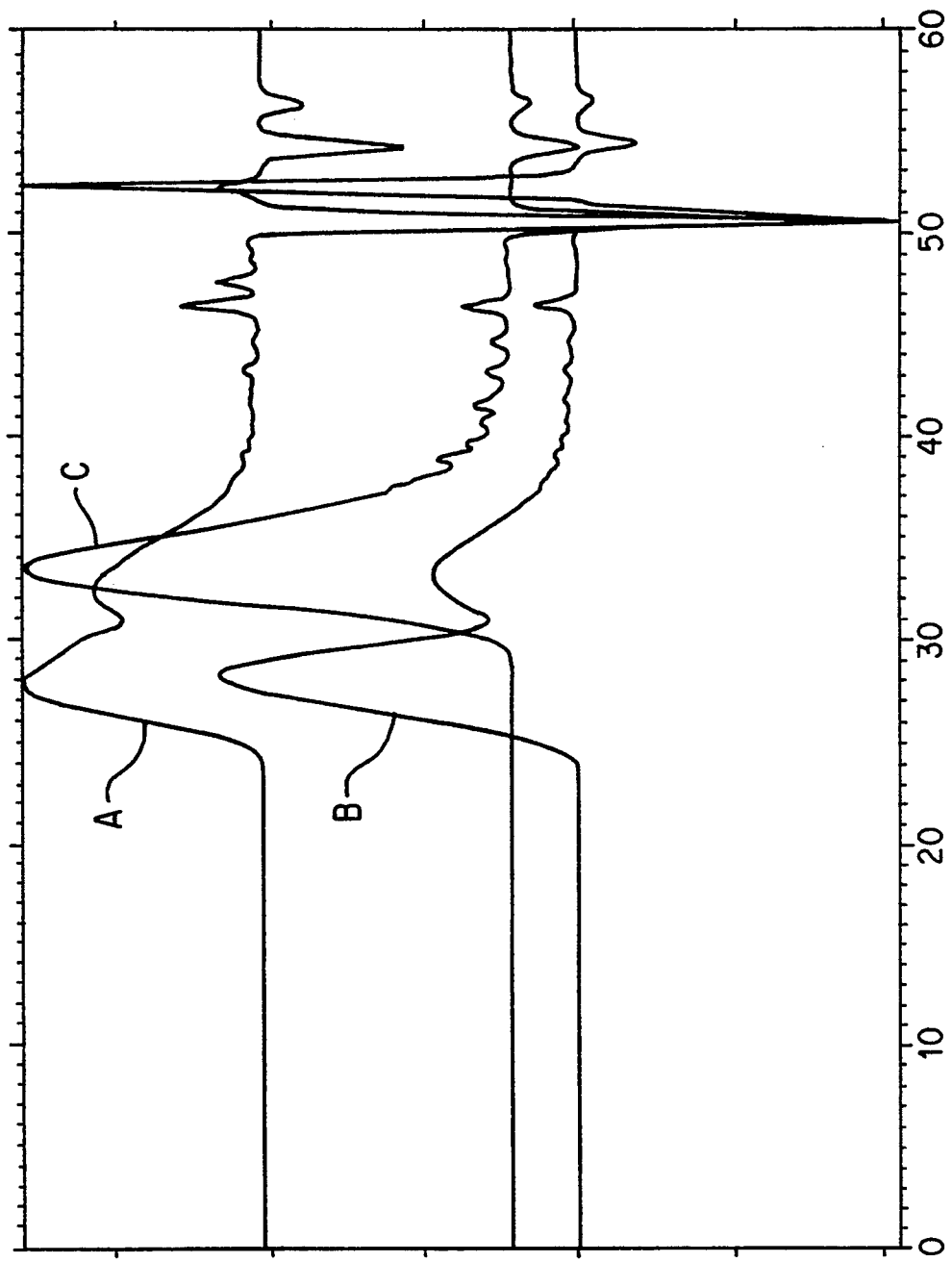

FUNCTIONAL-AMINE POLYESTERS

FIELD OF THE INVENTION

The invention is directed to functional-amine polyester polymers containing amine residues, which exhibit greater reactivity in organic peroxide, cross-linking polymerization systems. The inventive resins are particularly useful for preparing low-fix temperature, densely cross-linked toner resins by dramatically reducing the time and temperature at which dissociation of a cross-linking initiator occurs. The functional-amine polyesters are well suited for toner resins made in a reactive extrusion process for use in contemporary electrophotographic processes.

BACKGROUND OF THE INVENTION

Contemporary electrophotographic processes require temperatures of 160°–200° C. to fix toner on a support medium, e.g., a sheet of paper or transparency, creating a developed image. Such high temperatures may reduce or minimize fuser roll life, such as with fuser rolls made of silicone rubbers or fluoroelastomers (e.g., Viton ®), may limit fixing speeds, may necessitate higher power usage during operation, such as in a xerographic copier employing a hot roll fixing mechanism.

Electrophotographic toners are generally prepared by mixing or dispersing a colorant and possibly a charge enhancing additive into a thermoplastic binder resin, followed by micropulverization. Known thermoplastic binder resins include polystyrenes, styreneacrylic resins, styrene-methacrylic resins, polyesters, epoxy resins, acrylics, urethanes and copolymers thereof. Carbon black is often used as a colorant and alkyl pyridinium halides, distearyl dimethyl ammonium methyl sulfate, and the like are employed as charge enhancing additives.

Although many processes exist for fixing toner to a support medium, hot roll fixing, transferring heat very efficiently, is especially suited for high speed electrophotographic processes. In this method, a support medium carrying a toner image is transported between a heated fuser roll and a pressure roll, the image face contacting the fuser roll. Upon contact with the heated fuser roll, the toner melts and adheres to the support medium, fixing an image.

Toner fixing performance may be characterized as a function of temperature. The lowest temperature at which the toner adheres to the support medium is called the cold offset temperature; the maximum temperature at which the toner does not adhere to the fuser roll is called the hot offset temperature. When the fuser temperature exceeds the hot offset temperature, some of the molten toner adheres to the fuser roll during fixing, is transferred to subsequent substrates (phenomenon known as "offsetting"), and results for example in blurred images. Between the cold and hot offset temperatures of the toner is the minimum fix temperature, which is the minimum temperature at which acceptable adhesion of the toner to the support medium occurs. The difference between minimum fix temperature and hot offset temperature is called the fusing latitude.

The hot roll fixing system described above and a number of toners presently used therein exhibit several problems. First, the binder resins in the toners can require a relatively high temperature in order to be affixed to the support medium. This may result in high power consumption, low fixing speeds, and reduced fuser roll and roll bearing life. Offsetting itself can present a problem.

Toner resin which has a low fix temperature below 200° C. ("low melt toner resin"), preferably below 160° C., exhibits good offset temperature performance. Toners operating at lower temperatures reduce power needs and increase component life. Low melt toners reduce volatilization of release oil such as silicone oil which may occur during high temperature operation and cause problems when the volatilized oil condenses on other areas of the machine. Toners with a wide fusing latitude, providing liberal requirements for oil used as a release agent and improved particle elasticity may minimize copy quality deterioration related to toner offset. Hence, the desirability of low-melt temperature toner resins, particularly for use in hot-roll fixing xerographic processes is apparent.

Investigations have resulted in resins having a lower minimum fix temperature. Such resins may have a lower molecular weight. U.S. Pat. No. 3,590,000 to Palermiti et al. and U.S. Pat. No. 3,681,106 to Burns et al. disclose attempts to use polyester resins as toner binder. These polyester resins exhibit a minimum fix temperature lower than resins made from other materials, such as styrene-acrylic and styrene-methacrylic resins, but may also have an undesirable lower hot offset temperature.

A disadvantage in preparing conventional resins by an organic peroxide initiated reaction mechanism is the relative instability of the cross-linking system used. High temperatures are required to initiate and promote an acceptable reaction rate to achieve a desired degree of cross-linking. These higher temperatures, when producing cross-linked resins on a commercial scale, increase the cost of preparing resins and make them far less profitable commercially.

Skilled artisans, utilizing an organic peroxide aromatic tertiary amine system as a known crosslinking mechanism, have employed the tertiary amines in vinyl polymerization of composite resins, capitalizing on the symbiotic effect tertiary amines exhibit in a binary initiation system. See Brauer et al., "Initiator-Accelerator Systems for Dental Resins," Initiation of Polymerization, F. E. Jr. Ed., American Chemical Society, Washington, DC, p. 359 (1983). However, such applications of the organic peroxide/aromatic tertiary amine (binary initiation system), have been limited to vinyl polymerizations. In one such instance, 2,2'-azobisisobutyronitrile (AIBN) can polymerize vinyl monomers such as:

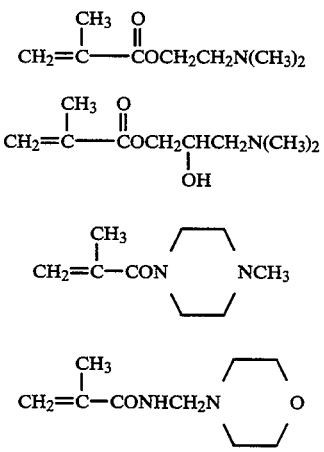

Studies suggest that free radicals may form on the α-C atom of the amine as follows:

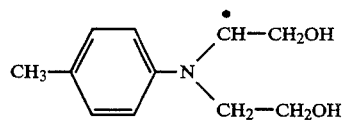

and

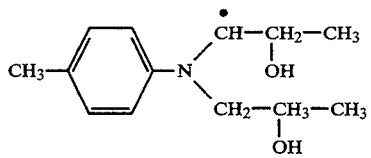

The UV spectra of the polymer solutions revealed that N,N-di(2-hydroxyethyl)-p-toluidine and N,N-di(2-hydroxypropyl)-p-toluidine moieties are present as end groups of a resulting polymer.

Although peroxide and heterocyclic tertiary amine systems have not received much attention, a drug, such as pilocarpine, containing heterocyclic tertiary amine, i.e., imidazolyl ring can couple with benzoyl peroxide to form a redox initiation system for vinyl polymerization at 40° C. to form a controlled drug delivery device for the drug pilocarpine in film or hydrogel form. See Xin-De Feng, "The Role of Amine in Vinyl Radical Polymerization," Die Makro Molekulare Chemie, 1992, pp. 1–17.

In a more recent study, Uphues et al. (U.S. Pat. No. 4,977,294) proposes a quaternary ammonium phosphate produced by (a) reacting a dicarboxylic acid with an alkoxylated tertiary amine; (b) mixing the aminofunctional polyester obtained, in water, with a mono and/or dialkylphosphoric acid ester; and (c) reacting the mixture of (b) with an alkylene oxide. These quaternary ammonium phosphates are used as anti-static agents for textile materials. The disclosed polymers have low molecular weight structures and are not useful in electrophotographic processes, employing densely crosslinked, high molecular weight polymers.

To date, the inventor believes that functional amines have not been employed in polyester systems, as in the invention. Furthermore, these systems have not previously been proposed for use in toner resins.

SUMMARY OF THE INVENTION

A functional amine substantially reduces the time and temperature at which dissociation of a peroxide to produce free radicals will occur. Functional amines, incorporated into a conventional polyester backbone, facilitate preparing cross-linked toner resins from linear base polyester resins for use in toners employing the inventive resins in electrophotographic processes. The invention utilizes a functional-amine polyester, produced by a process of the invention, to facilitate peroxide-initiated cross-linking of the base polyester, for example, by reactive extrusion processes used to prepare polyester toner resins.

The inventive functional-amine polyester contains a polyester backbone having an amine residue polymerized into the polyester backbone in an inert atmosphere. The amine residue is present in the polymerized functional-amine polyester in a concentration from about 0.1 to about 10.0 tool percent.

In a process for preparing a functional-amine polyester according to the invention, monomers and a functional amine, added to a reaction chamber, form a mixture. The reaction chamber is then flushed with an inert substance to a pressure not greater than atmospheric pressure and the monomers and functional amine polymerized, forming the functional-amine polyester.

BRIEF DESCRIPTION OF THE DRAWINGS

FIG. 2 is a gel permeation chromatograph of three reaction samples, 5 days after initial reaction, as prepared in Example 5 and illustrated in FIG. 1.

FIG. 3 is a gel permeation chromatograph of samples prepared in Example 8 using different peroxide polymerization initiators.

DETAILED DESCRIPTION OF PREFERRED EMBODIMENTS

Figure 1:
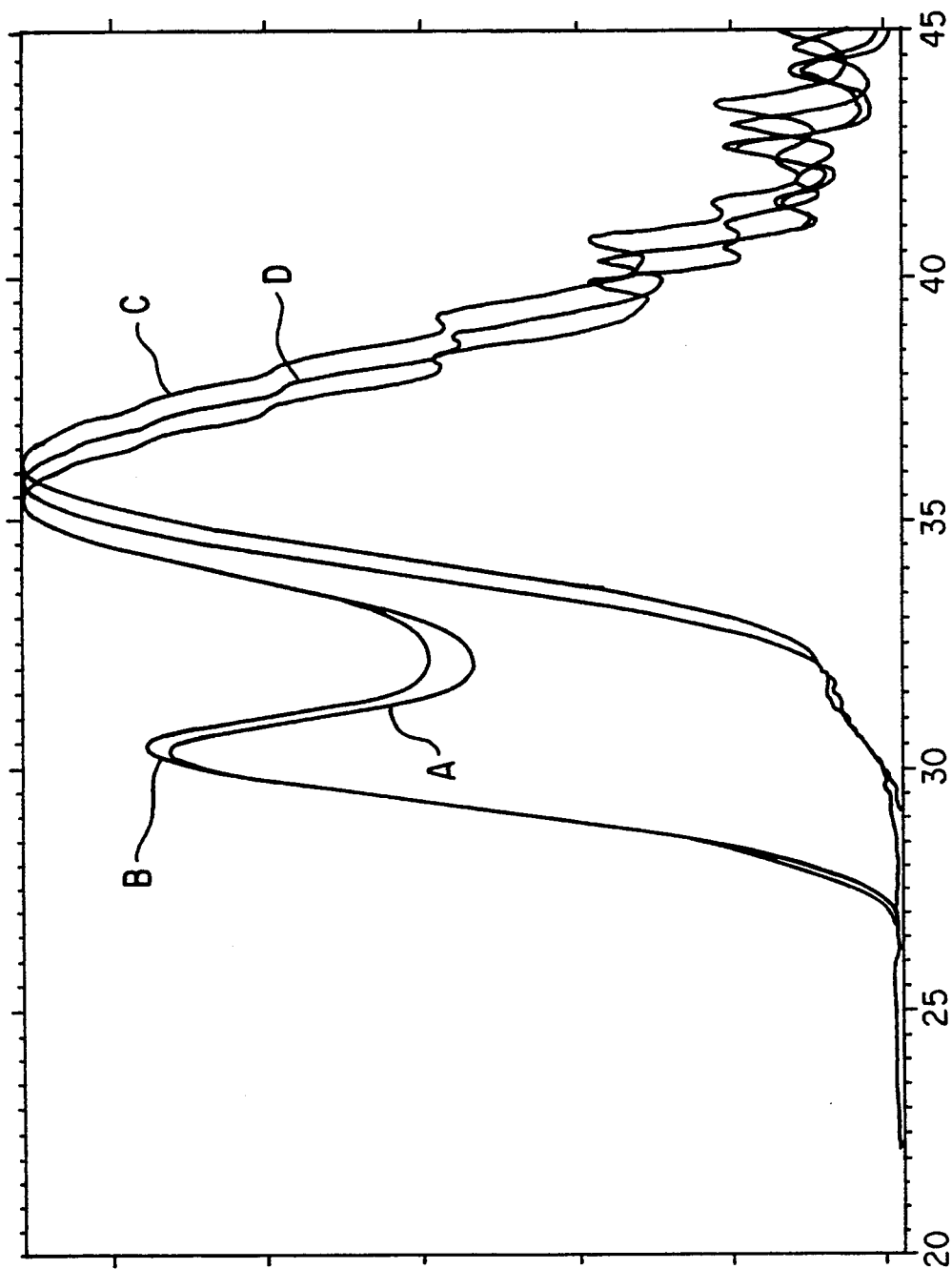
FIG. 1 is a gel permeation chromatograph of three reaction samples 24 hours after initial reaction, as prepared in Example 5.

Tertiary amines are known to promote homolysis of peroxides, allowing polymerization initiation at temperatures at which peroxides are normally inactive. As an example, benzoyl peroxide by itself has a half-life of 62 minutes at 90° C. However, in the presence of N,N-diethylaniline, its half-life is 3.6 minutes at 30° C.

Benzoyl peroxide-amine initiation includes such systems as A: benzoyl peroxide N,N-di(2-hydroxyethyl)-p-toluidine; B: benzoyl peroxide N,N-di(2-hydropropyl)-p-toluidine; C: benzoyl peroxide N,N-dimethyl toluidine; and D: benzoyl peroxide N,N-dimethylaniline. Polymerization rates ($R_r$) and overall activation energies of polymerization ($E_O$) of the above systems are:

| Initiation System | $R_r \times 10^2$ (mol./L · s) | $R_r$ | $E_0$ (kJ/mol) | Induction Period (min.) |
|---|---|---|---|---|
| A | 9.30 | 1.7 | 49.5 | 0.85 |
| B | 8.31 | 1.5 | 44.6 | 0.92 |
| C | 5.45 | 1.0 | 39.4 | 1.22 |
| D | 2.19 | 0.4 | 45.5 | 3.11 |

The concentration of benzoyl peroxide ([benzoyl peroxide]) equals the concentration of amine ([AMINE])- which is $2.0 \times 10^{-2}$ mol/L. (See Brauer et al.,supra).

The inventor has successfully synthesized new functional-amine polyesters by incorporating a functional amine residue, a component in binary initiation systems, into a polyester backbone.

A polyester containing the occasional functional-amine residue may remarkably facilitate free radical initiation of cross-linking in the presence of a peroxide during a process for cross-linking polyester resins. Such a mechanism is of potential importance in extending the latitude and scalability of any cross-linking process and significantly enhances possible monomer and polymer choices. If a high temperature free-radical initiator, such as di-t-butyl peroxide, is used in conjunction with a functional-amine polyester, the rate of cross-linking polymerization becomes much more dependent on the degree of mixing rather than on the effective rate of heating. Using the inventive resins, reaction time and temperature may be reduced by increasing the degree of mixing.

The specific properties imparted by the functional-amine residue to the inventive polyester suggest that polymerization, particularly cross-linking reactive extrusion processes, may now be more robustly scalable and less sensitive to conventional process variables. Product properties may now depend on degree of mixing, rather than both degree of mixing and temperature profile, as is presently the case in known, cross-linking polymerization processes.

Furthermore, a functional-amine polyester is necessary for miscibility with conventionally available polyester resins to produce polyester mixtures. The functional-amine polyesters aid in preparing densely crosslinked resins at the diffusion controlled reaction rates for polymers and not the more difficultly controlled faster diffusion rates of smaller molecules. Of secondary significance, a functional-amine polyester may permit use of more stable, and thus safer, peroxides for polymerization.

Thus, the inventive, functional-amine polyester comprises a polyester backbone polymerized from at least two monomers and from about 0.1 to about 10.0 tool percent of a functional amine, polymerized into the polyester backbone in an inert atmosphere at a pressure not greater than atmospheric pressure. In order to prevent undesirable cross-linking of the functional-amine polyester during polymerization of the monomers and functional amine, an inert atmosphere is required. Not all inert atmospheres will prevent cross-linking from occurring. Inert atmospheres may prevent cross-linking by forming complexes with the functional-amine residues. Exemplary inert atmospheres include, but are not limited to, carbon dioxide As discussed above, the functional-amine residue facilitates reaction of the functional-amine polyester in an organic peroxide system. Exemplary functional amines include, but are not limited to primary, secondary and tertiary alkyl amines and aromatic amines.

Preferred amines provide charge stabilization during a promotion step. Thus, primary functional alkyl amines are preferred, secondary functional alkyl amines are more preferred, tertiary functional alkyl amines are even more preferred and aromatic functional amines are most preferred. Additionally, preferred amines should possess a chemical function that allows the functional amine to be incorporated into a polyester backbone. A preferred functional group is the hydroxyl group, preferably two hydroxyl functional groups per molecule to allow incorporation throughout the backbone, however a single hydroxyl group in the amine molecule can allow it to incorporate into the polymer as an end group. Such compounds are often referred to as alkanolamines. Other functional amines are conceptually possible but often not practical. Using 2,6-pyridinedicarboxylic acid decarboxylates, no amine is incorporated into the polymer under the melt polymerization conditions commonly used.

Exemplary functional aromatic amines include, but are not limited to, N-phenyldiethanolamine, N,N-di(2-hydroxyethyl)-p-toluidine, N,N-di(2-hydroxypropyl)-p-toluidine, 2,6-dimethanol pyridine, 2,4-dihydroxy-5,6-dimethylpyrimidine, 2,4-dihydroxy dihydroxy-6-methylpyrimidine, 4,6-dihydroxypyrimidine, 2,4-dihydroxypyridine, phenylethylethanolamine.

Exemplary tertiary alkyl amines include, but are not limited to, methyldiethanolamine, ethyldiethanolamine, dimethylisopropanolamine, and diisopropylethanolamine.

Exemplary secondary and primary functional amines include, but are not limited to, the following alkanol amines: diethanolamine, diisopropanolamine, di-sec-butanolamine, 2-amino-2-ethyl-1,3-propanediol, methylethanolamine, phenylethanolamine, 2-aminoethanol, and 2-amino-2-methyl-1-propanol.

The polyester backbone into which the functional amine is incorporated may be prepared by reacting at least a first monomer and a second monomer to form a polyester having a first and second residues derived from the first and second monomers, respectively.

Polyester backbones incorporating the functional amine are low molecular weight condensation polymers which may be formed by step-wise reaction between a first monomer and a second monomer. The first monomer may be selected among both saturated and unsaturated diacids (or anhydrides). The second monomer may include, but is not limited to, a dihydric alcohol (glycol or diol). The resulting saturated or unsaturated polyesters according to the invention may be reactive (e.g., cross-linkable) on at least three fronts: (a) unsaturation sites (double bonds) along the polyester chain, if insaturated, (b) the functional amine group, and (c) functional groups other than the functional amine group, amendable to reaction, e.g., acid-base reaction in the polyester backbone, such as, carboxyl, hydroxy, etc.

Typical unsaturated or saturated polyester base resins useful for this invention are prepared by melt polycondensation or other polymerization processes using diacids and/or anhydrides and diols (second alcohol monomer). Suitable first monomers include, but are not limited to, saturated diacids and/or anhydrides, such as for example succinic acid, glutaric acid, adipic acid, pimelic acid, suberic acid, azelaic acid, sebacic acid, isophthalic acid, terephthalic acid, hexachloroendo methylene tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, the like and mixtures thereof. Preferred unsaturated diacids and/or anhydrides include maleic acid, fumaric acid, chloromaleic acid, itaconic acid, citraconic acid, mesaconic acid, maleic anhydride, the like and mixtures thereof.

Suitable diols include, but are not limited to, propylene glycol, ethylene glycol, diethylene glycol, neopentyl glycol, dipropylene glycol, dibromoneopentyl glycol, propoxylated bisphenol A, 2,2,4-trimethylpentane-1,3-diol, tetrabromo bisphenol dipropoxy ether, 1,4-butanediol, the like and mixtures thereof. Preferred diols should be soluble in solvents such as, for example, tetrahydrofuran, toluene and the like.

Preferred functional-amine polyesters are prepared from diacids and/or anhydrides such as, for example, maleic anhydride, fumaric acid, the like and mixtures thereof, diols such as, for example, propoxylated bisphenol A, propylene glycol, the like and mixtures thereof and functional amines such as, for example, N-phenyldiethanolamine, N,N-di(2-hydroxyethyl)-p-toluidine, N,N-di(2-hydroxypropyl)-p-toluidine, 2,6-dimethanol pyridine, A particularly preferred functional-amine polyester is polymerized from propoxylated 4,4'-isopropylidenebisphenol, fumaric acid and N-phenyldiethanolamine.

When cross-linked, the inventive functional-amine polyesters exhibit desirable minimum fix temperature, hot offset temperature and glass transition temperature which correspondingly impart improved blocking performance to toners resulting therefrom. The inventive polyesters are particularly useful as cross-linked toner resins and exhibit more desirable characteristics allowing for lower temperature, facilitated peroxide-initiated cross-linking processes, as compared with commercially-available, less-reactive linear base resins, such as disclosed in U.S. patent application Ser. No. 07/814,782 and used to prepare cross-linked toner resins by a process as disclosed in U.S. patent application Ser. No. 07/814,641, both to Mahabadi et al., the disclosures of which are entirely incorporated herein by reference. Mahabadi discloses preferred known polyesters, namely poly(propoxylated bisphenol A-co-fumarate), which are correspondingly cross-linked at high temperature.

The linear amine-functional polyesters provide for inexpensive polyester resins which more easily cross-link in organic peroxide systems without requiring high temperatures or extreme reaction conditions for cross-linking. The inventive functional-amine polyesters, in addition to offering advantages for preparing toner resins, retain desirable toner performance characteristics found in other conventional toners.

In a process for preparing an functional-amine polyester according to the invention, at least a first monomer, second monomer and a functional amine are polymerized in a reaction chamber flushed with an inert atmosphere at a pressure not greater than atmospheric pressure. Upon heating, optionally in the presence of a catalyst, the monomers and functional amine polymerize to form the functional-amine polyester. Known polyesterification catalysts may chosen, such as the alkoxide complexes of titanium or various tin catalysts such as n-butylstannoic acid.

Preferably, after polymerization, pressure of the inert atmosphere in the reaction chamber is lowered to a pressure ranging from about 5 mbar to about 20 mbar. Exemplary polymerization temperatures range from about 150° C. to about 250° C., preferably from about 185° C. to about 215° C. Preferably, a first monomer and a second alcohol monomer are first reacted as discussed above, and then the functional amine added to complete the polymerization reaction.

While the invention has been described with reference to particular preferred embodiments, the invention is not limited to specific embodiments given or the Examples provided below. Other embodiments and modifications can be made by those skilled in the art without departing from the spirit and scope of the invention.

EXAMPLE 1

A 1 liter stainless steel reactor is equipped with a helical coil stirrer and a double mechanical seal. It is driven by a 0.5 hp motor with a 30:1 gear reduction. A torque meter is part of the stirrer drive. The reactor is heated electrically. The pressure is monitored by both a pressure transducer and a pirani gauge. The temperature is monitored by a platinum resistance temperature detector. The pressure and temperature are precisely controlled and profiled by a Fischer and Porter Chameleon controller. A glass still head is used to collect the by-product distillate.

To the reactor are added weighed quantities of the following materials:

| | | |
|---|---|---|
| Propoxylated 4,4'-Isopropylidenebisphenol | 307 g | 0.9 moles |
| N-phenylidiethanolamine | 18.1 g | 0.1 moles |
| Adipic acid | 146.1 g | 1.0 mole |
| Titanium butoxide | 0.5 ml | |

The reactor is sealed and the temperature raised to about 50° C. Stirring commences at a slow rate, which is later increased to about 20 rpm, when the temperature reaches 100° C. The temperature is raised to about 185° C. and maintained at 185° C. for about 150 minutes. The temperature is then raised to about 215° C. and held for about 280 minutes.

During heating, the reactor is slowly flushed with carbon dioxide gas. The reactor pressure is maintained at about atmospheric pressure for the first 300 minutes and then lowered over the course of an hour to below 5 mbar, the carbon dioxide flow gradually being reduced during this time and this low pressure maintained until completion of the reaction, approximately 60 minutes later.

At completion of the reaction, the pressure is returned to atmospheric pressure using carbon dioxide. The molten resulting polymer is removed by means of a bottom drain valve.

The obtained copolymer, copoly[(4,4'-isopropylidenebisphenyl bispropanol bisether; N-phenyldiethanolamine)/adipic acid](0.45:0.05:0.5 M) has a Tg of 11° C. as determined on a Du Pont Instrument DSC10. Gel permeation chromatography molecular weight averages determined on a Waters chromatography system using 100 Å, two 500 Å and 104 Å, Waters Ultrastryragel columns, calibrated with narrow molecular weight polystyrene standards, are Mn=2000 and Mw=4900. NMR confirms the molecular structure.

EXAMPLE 2

The procedure in Example 1 is repeated, but instead the following reactants are used:

| | | |
|---|---|---|
| Propoxylated 4,4'-isopropylidenebisphenol | 307 g | 0.9 moles |
| N-phenylidiethanolamine | 18.1 g | 0.1 moles |
| Fumaric acid | 116 g | 1.0 moles |
| Titanium butoxide | 0.5 ml | |
| Hydroquinone | 0.4 g | |

The obtained copolymer, copoly[(4,4'-isopropylidenebisphenyl bispropanol bisether) N-phenyldiethanolamine/fumaric acid](0.45:0.05:0.5M) has a Tg of 62° C. and molecular weights of Mn=5900 and Mw=15,400, determined by gel permeation chromatography.

EXAMPLE 3

The procedure of Example 1 is repeated but instead using the following weighed quantities of reactants:

| | | |
|---|---|---|
| Propoxylated 4,4'-isopropylidenebisphenol | 274.4 g | 0.8 moles |
| N-phenyidiethanolamine | 23.8 g | 0.2 moles |
| Fumaric acid | 77.3 g | 0.667 moles |
| adipic acid | 48.7 g | 0.333 moles |
| Titanium butoxide | 0.5 ml | |
| Hydroquinone | 0.4 g | |

The obtained polymer, copoly[(4,4'-isopropylidenebisphenyl bispropanol bisether; N-phenyldiethanolamine)/fumaric acid]; (0.4:0.1:0.33:0.17M) has a Tg of 37° C. and gel permeation chromatography determined molecular weights of Mn=5300 and Mw=16,300.

EXAMPLE 4

The procedure of Example 1 is repeated but instead using the following reactants:

| | | |
|---|---|---|
| Propoxylated 4,4'-isopropylidenebisphenol | 248.5 g | 0.724 mole |
| 2,6-dimethanol pyridine | 25.0 g | 0.18 moles |
| Adipic acid | 131.5 g | 0.9 moles |
| Titanium butoxide | 0.5 ml | |

The obtained polymer, copoly[(4,4'-isopropylidenebisphenyl bispropanol bisether; 2,6-dimethanol pyridine)-/adipic acid](0.4:0.1:0.5M) has a Tg of 13° C. and a gel permeation chromatography determined molecular weight of Mn=4500 and Mw=9600.

Examples 5-8 illustrate the utility of the polyesters prepared in Examples 1-4. Of primary significance is that many of the reactions are carried out at room temperature. Regardless of temperature used in Examples 5-7, the peroxides are thermally active, in the absence of amine-system couplers, only at temperatures much higher than employed here. The 1-hour half life temperatures for the initiators are: benzoyl peroxide, 91° C.; t-butyl ethylhexyl monoperoxycarbonate, 122° C.; and t-butyl hydroperoxide, 200° C.

EXAMPLE 5

Two 10 portions of the copolymer prepared in Example 1 are each dissolved in 20 g of styrene. To each solution are added 0.5 g of benzoyl peroxide; to one sample 50 microliters of cobalt-naphthalate is also added. As a control, 10 g of copoly[4,4'-isopropylidenebisphenyl bispropanol bisether/fumaric acid] are dissolved in 20 g of styrene. To the control is added 0.5 g of benzoyl peroxide. After 3-4 hours no polystyrene is detected by gel permeation chromatography in any of the samples. After about 24 hours, polystyrene is easily seen in the two samples employing the copolymer of Example 1. No polystyrene is found in the control. The comparative gel permeation chromatographs are shown in FIG. 1. Plot A in FIG. 1 confirms the presence of polystyrene in the mixture not containing cobalt-naphthalate. Plot B in FIG. 1 confirms the presence of polystyrene in the reaction mixture containing cobalt-naphthalate after the 24 hour period. Plots C and D illustrate absence of any formed polystyrene after 3 or 4 hours, each representing only a polyester copolymer peak. After 5 days the polystyrene peak grows large, relative to the polyester peak in the two samples employing the copolymer of Example 1. Still, no polymer had formed in the control. The comparative gel permeation chromatographs after 5 days are shown in FIG. 2. Plots A and B correspond to the same reference samples, A and B, shown in FIG. 1. Plot E is for the control and represents no polystyrene component.

EXAMPLE 6

A 10 g portion of the copolymer of Example 2 is dissolved in 20 g of styrene and then 0.5 g of benzoyl peroxide is added to the solution. After 24 hours, attempted dissolution of the mixture in tetrahydrofuran yields an unfilterable micro-gel, the result of cross-linking between the styrene and fumaric acid in the polyester backbone. After several days a solid, transparent block is formed, precluding analysis by gel permeation chromatography.

EXAMPLE 7

To three samples, consisting of 1 g of the copolymer of Example 3 and dissolved in 2 g of styrene, a different peroxide initiator (0.05 g) is added to each sample: one sample, benzoyl peroxide, another, t-butyl ethylhexyl monoperoxycarbonate; and the third t-butyl hydroperoxide. The sample employing benzoyl peroxide results in solid glass in 3-4 hours. The other two samples remain liquid much longer, for over 24 hours. Upon warming to about 70° C. the liquid solidifies in about 2 hours. As in Example 6, due to an insoluble nature of the formed solid, gel permeation chromatography analysis could not be carried out.

EXAMPLE 8

Two samples, each consisting of 1 g of the copolymer prepared in Example 4, are dissolved in 2 g of styrene. To each sample is added a different peroxide initiator (0.05 g); one sample: benzoyl peroxide and the second: t-butyl hydroperoxide. The benzoyl peroxide sample solidifies after several days at room temperature. The weight average molecular weight (Mw), as determined by gel permeation chromatography increases from 9600 for the polyester alone to 110,000 for the polystyrene/polyester mixture. The molecular weight distribution increases from 2.1 to 9.6. The sample using t-butyl initiator required subsequent treatment; namely, heating at 70° C. for about 16 hours. The weight average molecular weight (MW), as determined by gel permeation chromatography, increases from 9600 for the polyester alone to 128,000 for the polystyrene/polyester mixture. The molecular weight distribution increases from 2.1 to 10.8. Comparative plots are shown in FIG. 3. Plot A corresponds to the benzoyl peroxide sample and Plot B to the t-butyl sample. Plot C is the copolymer of Example 4 without a benzoyl peroxide component. The different distributions of the high molecular weight polystyrene fraction occur at about 26 minutes. The large residual styrene peak is at 52 minutes in these samples. Virtual elimination of styrene using benzoyl peroxide, as compared with the copolymer Plot C is represented in FIG. 3.

What is claimed is:

1. A linear, cross-linkable functional-amine polyester polymer, comprising:
    at least a first residue of a diacid or anhydride monomer;
    a second residue of a aromatic diol monomer; and
    from about 0.1 to about 10.0 mole percent of a functional-amine residue of a functional-amine selected from tertiary aromatic amines consisting of N-phenyldiethanolamine, N,N-di(2-hydroxyethyl )-p-toluidine, N,N-di(2-hydroxypropyl )-p-toluidne, 2,6-dimethanol pyridine, 2,4,-dihydroxy-5,6-dimethyl-pyrimidine, 2,4-dihydroxy-5-methylpyrimidine, 2,4-dihydroxy-6methylpyrimidine, 4,6-dihydroxypyrimidine and phenylethylethanolamine;
    said polyester polymer being prepared by reacting the first and second monomers and the functional-amine in an inert atmosphere.

2. The polyester according to claim 1, wherein a functional group of the functional-amine is at least one hydroxy group.

3. The polyester according to claim 2, wherein the functional-amine has at least di-hydroxyl functionality.

4. The polyester according to claim 1, wherein the functional amine is selected from the group consisting of aromatic functional amines and tertiary, secondary and primary alkyl functional amines.

5. The polyester according to claim 1, wherein the first monomer and a second monomer are reacted prior to reacting with the functional amine.

6. The polyester according to claim 1, wherein the first monomer is a saturated or unsaturated diacid or anhydride.

7. The polyester according to claim 6, wherein the first monomer is selected from the group consisting of succinic acid, glutaric acid, adipic acid, pimelic acid, suberic acid, azelaic acid, sebacic acid, isophthalic acid, terephthalic acid, hexachloroendo methylene tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride and mixtures thereof.

8. The polyester according to claim 7, wherein the saturated diacid or anhydride is selected from the group consisting of maleic acid, fumaric acid, chloromaleic acid, methacrylic acid, acrylic acid, itaconic acid, citraconic acid, mesaconic acid, maleic anhydride and mixtures thereof.

9. The polyester according to claim 1, wherein said second monomer is propoxylated Bisphenol A.

10. The polyester according to claim 1, wherein said second monomer is propoxylated 4,4'-isopropylidenebisphenol.

11. The polyester according to claim 1, wherein said functional-amine is N-phenyldiethanolamine.

12. The polyester according to claim 1, wherein said first monomer is fumaric acid, said second monomer is propoxylated 4,4'-isopropylidenebisphenol and said functional-amine is N-phenyldiethanolamine.

* * * * *